(12) United States Patent
Clavbo

(10) Patent No.: US 7,092,874 B2
(45) Date of Patent: Aug. 15, 2006

(54) METHOD AND DEVICE FOR SPEECH ANALYSIS

(75) Inventor: Börje Clavbo, Torkel Tunnbindares grand 8 (SE)

(73) Assignee: Forskarpatent I Syd Ab, Lund (SE)

( * ) Notice: Subject to any disclaimer, the term of this patent is extended or adjusted under 35 U.S.C. 154(b) by 443 days.

(21) Appl. No.: 10/438,805

(22) Filed: May 16, 2003

(65) Prior Publication Data

US 2004/0002853 A1    Jan. 1, 2004

Related U.S. Application Data

(63) Continuation of application No. PCT/SE01/02482, filed on Nov. 9, 2001.

(30) Foreign Application Priority Data

Nov. 17, 2000    (SE)    .................................... 0004221

(51) Int. Cl.
*G10L 21/00*    (2006.01)

(52) U.S. Cl. ...................................... 704/207; 704/210
(58) Field of Classification Search ................ 704/207, 704/210

See application file for complete search history.

(56) References Cited

U.S. PATENT DOCUMENTS

| | | | |
|---|---|---|---|
| 2,183,248 A | 12/1939 | Riesz | |
| 4,093,821 A * | 6/1978 | Williamson | ................. 704/207 |
| 5,148,483 A | 9/1992 | Silverman | |
| 6,151,571 A | 11/2000 | Pertrushin | |
| 6,275,806 B1 * | 8/2001 | Pertrushin | ................... 704/272 |
| 6,353,810 B1 * | 3/2002 | Petrushin | .................... 704/236 |

OTHER PUBLICATIONS

Murray et al.; "Toward the Simulation of Emotion in Synthetic Speech: A Review of the Literature on Human Vocal Emotion"; J. Acoust. Soc. Am.,vol. 93, No. 2, pp. 1097-1108, (1993).

Banse et al.; "Acoustic Profiles in Vocal Emotion Expression"; Journal of Personality and Social Psychology, vol. 70, No. 3, pp. 614-636, (1996).

* cited by examiner

*Primary Examiner*—Daniel Abebe
(74) *Attorney, Agent, or Firm*—Finnegan, Henderson, Farabow, Garrett & Dunner, LLP

(57) ABSTRACT

A device and a method for speech analysis are provided, comprising measuring fundamental notes of a speech sequence to be analysed and identifying frequency intervals between at least some of said fundamental notes. An assessment is then made as to the frequency at which at least some of these thus identified intervals occur in the speech sequence to be analysed. Among other applications are speech training and diagnosis of pathological conditions.

40 Claims, 1 Drawing Sheet

METHOD AND DEVICE FOR SPEECH ANALYSIS

CROSS REFERENCE TO RELATED APPLICATIONS

This application is a continuation of International Application No. PCT/SE01/02482, filed Nov. 9, 2001, and claims the benefit of priority of Swedish Patent Application No. 0004221-8, filed Nov. 17, 2000, the content of both of which is incorporated herein by reference.

TECHNICAL FIELD OF INVENTION

The present invention relates to a method and a device for analysing the human speech. The invention also relates to a method and a device for speech training, to a method and a device for providing speech syntheses as also to a method and a device for diagnosing pathological conditions.

BACKGROUND OF THE INVENTION

When a human being is speaking, the listener receives impressions and signals beyond what is actually uttered, i.e. the objective contents of the uttered words. These additional impressions and signals assist the listener in interpreting the factual contents of the uttered words and they also lead to a conscious or unconscious judgement of the speaker's credibility, mood and so on.

Such additional signals could be for instance the tempo used by the speaker, i.e. the speed with which he utters the words, and the rhythm he uses. Also, the pitch of the voice communicates some information, and for example deep and dark bass voices often are perceived as confidence-inspiring and soothing.

The human speech contains one fundamental tone and a number of higher-pitched overtones. Thus, the fundamental note is the lowest frequency that is perceivable at any given time, and equipment for measuring the fundamental notes of speech and song is already known. From EP 0 821 345 and U.S. Pat. No. 6,014,617, for example, identification of the notes of human speech is already known.

In addition, it is already known that the fundamental notes of speech change progressively, and usually such change is governed by the context, i.e. the contents of the speech and the environment in which the speech is made. Attempts have also been made to re-create such context-dependent variations in speech syntheses. This phenomenon is described for instance in EP 0 674 307.

In addition, the speaker's body language emits signals to the listener.

However, much information communicated via the human speech is not perceived consciously, and therefore cannot be analysed. Consequently, there is a need for means, such as methods and devices, for improved speech analyses and/or analyses of further aspects of the speech.

OBJECT OF THE INVENTION

Consequently, it is an object of the present invention to provide a method and a device for speech analysis that completely or at least partly solve the above-mentioned problems inherent in the prior-art technique.

This problem is solved by means of the method and the device in accordance with the invention.

SUMMARY OF THE INVENTION

The inventor of the present invention has shown that surprisingly also the continuous shift of fundamental notes that normally takes place in normal speech and the intervals used therefor are important to the perception of speech. This continuous shift of pitch is analysed in accordance with the teachings of the invention on the basis of the intervals used in these shifts, and the occurrence of different intervals affects the way in which the speech is perceived. Depending on the extent of the use of different intervals, for example, the speech may express different moods, different emotional states, different degrees of reliability, and so on. By means of the speech, a communication of emotions thus takes place, which on a subconscious level is perceived by the listeners depending on the intervals used, and which goes beyond the words actually uttered, the pitch of the voice, the tempo of the language and other obviously communicative parts of the speech. Speakers as well as listeners normally are totally unaware, however, of this additional communicative dimension of speech.

Although the choice of intervals used in normal speech takes place on an unconscious level, it has been found that it can be affected to some extent. It is therefore possible to make use of the invention also to consciously modify the choice of intervals in order to thus impart to the voice and the speech certain sought-after expressions. This is part of another aspect of the present invention.

Furthermore, it has unexpectedly been found that the subconscious choice of intervals that the human being makes when she speaks is affected by the psychological and physiological well-being of the individual. Thus, it is possible, by means of the analysis in accordance with the invention, to perceive deterioration of the psychological or physiological state of the speaker and also to perceive actual pathological conditions. In many types of diseases, this may be possible at an earlier date of the progress of a disease than is possible by means of many other alternative diagnostic methods. This feature is part of another aspect of the present invention.

BRIEF DESCRIPTION OF THE DRAWINGS

The invention will be described in more detail in the following for exemplifying purposes by means of some embodiments and with reference to the accompanying drawings, in which.

DETAILED DESCRIPTION OF PREFERRED EMBODIMENTS

Figure 1:
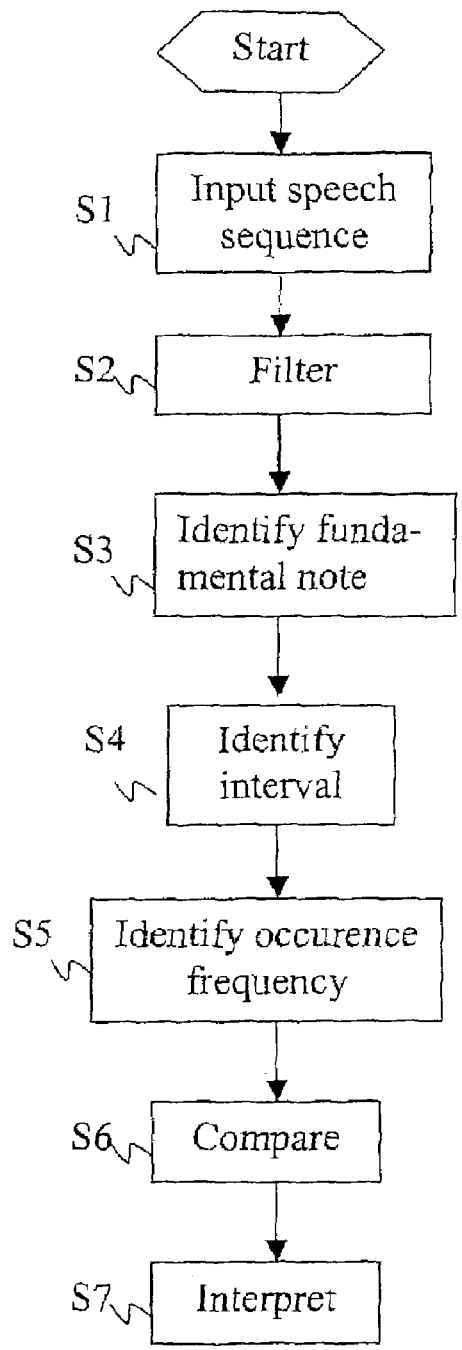
FIG. 1 is a schematic flow chart of a first embodiment of a method in accordance with the invention.
Figure 2:
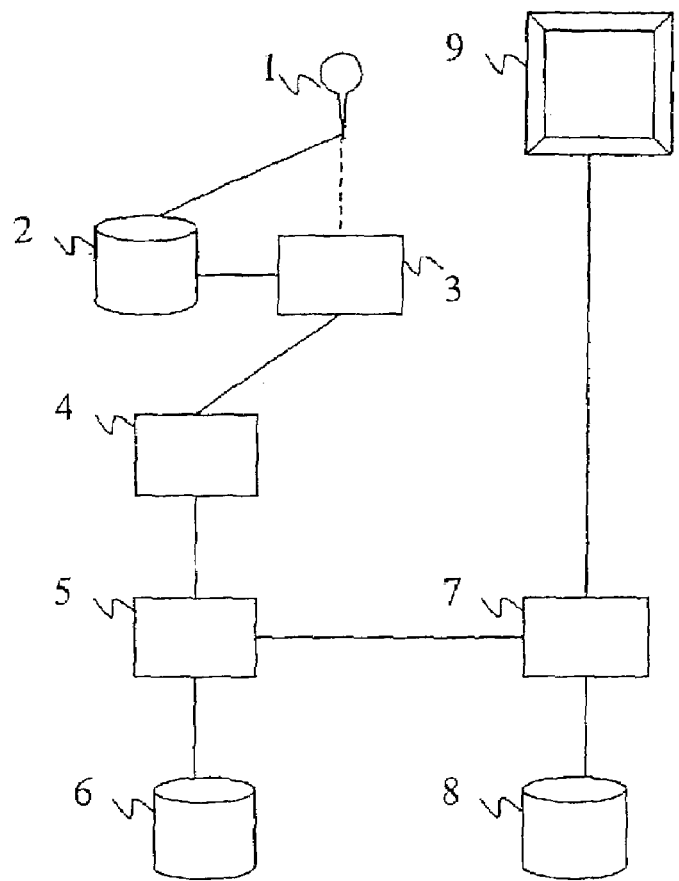
FIG. 2 is a schematic block diagram of a first embodiment of a device in accordance with the invention.

FIG. 1 schematically represents a flow chart of one embodiment of a method for speech analysis in accordance with the invention. In a first step S1 a speech sequence is recorded. This could be effected by direct recording of speech for analysis in a processing unit, the subsequent analysis advantageously being effected in real time. However, it is likewise possible to record speech sequences in advance on a registering medium, such as a cassette tape, on CD discs, in computer memories, and so on.

Preferably, filtering is carried out in step S2. Such filtering could involve separating-off notes that are too short, such that only notes of sufficient duration, preferably above a predetermined time threshold value, are carried forward for analysis. Alternatively or as a supplement, the filtering operation could also involve perception of notes of sufficiently high strength, preferably above a predetermined amplitude threshold value. In this manner, too weak notes are screened off.

Alternatively or as a supplement, the filtering operation could also involve the formation of the mean value of the pitch during a predetermined time interval, and the mean value thus formed is used in the subsequent analysis. In this manner, it becomes possible to handle glissando, i.e. gliding pitch movements over several notes, suggestions and so on in a convenient manner.

In step S3, the notes remaining from the filtering process are analysed, whereby the fundamental notes are identified. The identification process comprises analysis of the speech sound and identification of the lowest audible or sounding frequency. This could be effected for example in the manner described in EP 0 821 345 and U.S. Pat. No. 6,014,617 but other methods are likewise possible. Preferably, melismatically as well as syllabically occurring notes are identified.

However, alternatively, the identification step could instead be carried out before the filtering step.

The thus identified fundamental notes are then further analysed in step S4, whereby at least some intervals between close fundamental notes are identified. Preferably, all intervals between neighbouring notes are identified, but it is likewise possible to only identify all, or at least the majority of the intervals that are deemed to be particularly important to the current purpose of the analysis. It could likewise be justified, at least for some applications, that the step of identifying the intervals does not involve establishing the frequency differences between close notes only but also the direction in which the change occurs, i.e. ascending or descending pitch/interval.

In step 5, a suitable statistical method is used to establish a measurement of how often intervals that are central to the analysis occur in the speech sequence to be analysed. Such measurements could comprises for example one or several of:

the proportion of a certain interval among all intervals;
the proportion of a certain interval among a predetermined number of intervals,
the proportions of occurrence of one, two or several selected intervals.

It is likewise possible, however, and in some cases useful to determine the occurrence of certain sequences of intervals, i.e. intervals between three or several fundamental notes in succession and the locations of the intervals, i.e. their pitch position.

For the analysis of the thus determined intervals the following qualities could be associated generally with different intervals:

Unison, perfect prime (R1): Thoughtful (reflective), progressive
Minor second (L3): Searching, orientating
Major second (S2): Graceful, self-exposing
Minor third (L3): Melancholic, passive
Major third (S3): Optimistic, pushy
Perfect fourth (R4): Friendly
Augmented fourth/diminished fifth/tritone (Trit): Creative, insistent
Minor sixth (L6): Soft
Major sixth (S6): Stimulating
Minor seventh (L7): Painful
Major seventh (S7): Violent, angry
Octave (R8): Cheerful, encouraging.

Intervals above one octave normally may be classified and grouped separately, or alternatively be combined with corresponding intervals below one octave.

For many examinations it could be useful to separate out intervals from the following sub-groups [A]: unison (R1), minor second (L2), major second (S2), minor third (L3), major third (S3), minor sixth (L6) and major sixth (S6); respectively [B]: perfect fourth (R4), augmented fourth/diminished fifth (tritone), perfect fifth (R5), minor seventh (L7), major seventh (S7) and octave (R8).

In addition, intervals mostly occurring as ascending can be characterised as confirming, interval mostly occurring as descending as independent and intervals essentially occurring as ascending as often as descending as diplomatic Sequences that it is particularly interesting to identify are sequences comprising notes that are part of major or minor chords, i.e. fundamental note, third and fifth. Above all, it is fundamental-position arpeggios comprising three notes that are interesting, reversed or non-reversed. However, the fundamental note may also occur in two positions (i.e. interval of an octave). Also other chord sequences could be of interest, however, depending on the intended use of the analysis.

More particularly, it is also often interesting to compare the occurrence of minor thirds (L3) and major thirds (S3). It is often also interesting to distinguish the occurrence of tritone chord movements, as also to separate out the occurrence of and particularly repeats of unisons (R1), especially in the case of ritardandoes. This could be a sign for example of hesitation, thoughtfulness and so on. Also the position of different intervals, i.e. the pitch level of their start or finish could be a significant feature indicating different states.

The analysis described above may be used in various different ways. One application is for a psychological analysis of the speaker, an application that may be used to assess personality, the speaker's mood and emotional state and so on. The method therefore is applicable in many cases where such psychological investigations and analyses are of interest, for instance in the case of employment interviews, clinically for psychiatric care and the like, for lying detection purposes and so on.

It has also been found that this speech analysis may be used to interpret the speaker's physiological well-being and in consequence thereof also for diagnosing different pathological conditions. For example, the occurrence of non-fundamental movements (that is tritone chord movements) appears to be reduced or disappear completely, and that the occurrence of minor intervals (L3) to be more frequent in many pathological conditions.

When the analysis is to be used for some definite purpose also a subsequent interpretation step S6 normally is effected. This interpretation may be based on a comparison with normal values. These normal values could either be general ones, or preferably be adapted to various categories. These categories could reflect for instance language affiliation, nationality and/or other environmental and contextual aspects. Alternatively, or as a supplement, the grouping into categories could also be based on personal properties, such as sex, age, previous experience and so on. Various standard values and comparisons suitably may be used as well, depending on the intended objective.

However, instead of standard values or as a supplement to a comparison of this kind it is likewise possible to use earlier analyses made with respect to the same speaker. In this manner, it becomes possible to perceive differences over time, changes that may he used for example to identify pathological conditions of a mental or physiological nature.

The analysis defined above may also be used for speech training purposes, in which case the assessed interval frequencies are compared with preferred values. These preferred values could be extracted in order to suit different situations and emotional states. In addition, the comparison could be presented to the user, preferably in real time. It is also preferable to automatically separate out preferred measures in order to reduce the differences between the analysed speech and the preferred values. This may be effected by identification of for example the intervals for which the difference is the maximum one or the intervals that are deemed to be the most important ones, and on the basis thereof retrieve pre-stored instructions suggesting suitable measures. The method of speech training may be used for language-learning, for training actors, for training speaking in public, and so on.

A device for performing a method as above comprises in one embodiment a means 1 for recording a speech sequence and a registering medium 2 for storing the recorded sequence. The recording means could be e.g. a microphone, and the registering medium a cassette, a data memory, a CD disc or the like. Possibly, pre-stored speech sequences could, however be used for the analysis. In addition, it is possible to carry out the analysis in real time, in which case the registering medium could be excluded.

The device further comprises a filtering means 3 to filter the recorded signal. The filter could be designed to carry out some or all of the filtering operations indicated previously. The filter could also comprise several filtering units.

In addition, the device comprises measuring means 4 to determine the fundamental notes of the speech signal. This device could be e.g. a DSP unit (Digital Signal Processing) or operate in the manner described in EP 0 821 345 or U.S. Pat. No. 6,014,617, which publications are included herein as references. Other measuring means able to determine fundamental notes are also possible. Alternatively, the measuring means could also be arranged ahead of the filtering means.

The analysed fundamental notes are carried forward to a means 5 designed to identify the intervals between close fundamental notes in the manner described previously and the identified intervals are carried forward to a means for assessment of the frequency at which at least some of the sought-after intervals occur. Advantageously, this means could comprise a commercially available statistics programme.

The device could also comprise a comparative means 6, which is arranged to compare the results of at least some of the interval assessments. This comparative means then preferably compares the assessed frequency for some or all intervals with a preferred frequency determined in advance, as discussed earlier on. The previously determined values preferably are stored in a memory unit or a database 6.

Advantageously, the device also comprises an interpreting means 7 arranged to analyse found differences. The interpreting means could also be connected to a database 8 for automatic supply of instructions for measures, diagnoses, and so on. These instructions, results of comparison operations, etcetera could advantageously be presented to the user via a presentation means 9, which could be a display, a loudspeaker or the like.

The device defined in the aforegoing preferably could be realised in a conventional PC unit equipped with a microphone and sound cards for signal processing. The databases could either be stored in one or several memories in the computer or be accessible via communication networks, such as the Internet.

The method and the device for analysis as described above could likewise be used for speech-analysis control. In this case, conventional and prior-art speech synthesising methods and devices may be used, and these methods and devices are controlled in accordance with analyses disclosed by the invention. The synthesis could be controlled so as to convey different emotional states, moods and other expressions. In addition, in this respect the speech synthesis could be adapted to simulate different individuals or groups of individuals.

The invention has been described herein by means of various embodiments. It should be appreciated, however that other varieties of the invention than those defined herein are possible. For example, only a small number of intervals may be identified, other intervals or groups of intervals may be used for the analyses, the fundamental notes may be measured in other ways, and so on. It is likewise possible to use the inventive analysing method and the inventive analysing device for other purposes than for speech training and diagnosing. For example, analysis of this kind could be used for lie detection, for preliminary judgement of individuals in conjunction with for example employment interviews, and so on. It is likely that a more detailed analysis of a speech sequence could be used for identification purposes, In addition, an analysis of the kind taught by the invention could be used to select and to group individuals in different constellations and the like, allowing adjustments to be made aiming at increasing the likelihood for harmony and co-operative conditions within the group.

These and other closely-related varieties should be regarded to be embraced by the invention as the latter is delimited by the appended claims.

The invention claimed is:

1. (C) A method for analysing the human speech, comprising:
   (A) measuring sounding fundamental notes of a speech sequence to be analysed;
   (B) identifying the frequency intervals between at least two of the fundamental notes in succession; and
   (C) assessing the frequency at which at least one of the frequency intervals thus identified occurs in the speech sequence to be analysed
   wherein the measurement of fundamental notes in the speech sequence to be analysed comprises distinguishing fundamental notes of sufficient duration above a predetermined threshold value and separating fundamental notes of sufficient loudness, whereby only the fundamental notes thus separated are identified.

2. A method as claimed in claim 1, wherein the measurement of fundamental notes in the speech sequence to be analysed comprises separating fundamental notes of sufficient loudness above a predetermined amplitude threshold value.

3. A method of speech synthesizing, comprising the steps of analysing at least one speech sequence from at least one person by means of an analysing method as defined in claim 2, and on the basis of said analysis controlling the production of synthetic speech on the basis of at least one aspect of said analysis.

4. A method as claimed in claim 3, wherein said analysis comprises an appraisal of several speech sequences from the same individual.

5. A method as claimed in claim 3 or 4, wherein said analysis comprises an appraisal of speech sequences from several different individuals.

6. A method as claimed in claim 1, wherein measuring the fundamental notes in the speech sequence to be analysed comprises establishing a pitch mean value during a predetermined time interval, and using the mean value thus obtained for identification of fundamental notes.

7. A method as claimed in claim 1, wherein identifying the frequency intervals also comprises identification of whether the frequency interval is ascending or descending.

8. A method as claimed in claim 1, wherein at least minor thirds (L3) and major thirds (S3) are identified.

9. A method as claimed in claim 1, comprising identification of at least one frequency interval from the group: unison (R1), minor second (L2), major second (S2), minor third (L3), major third (S3), minor sixth (L6), and major sixth (S6); and at least one frequency interval from the group perfect fourth (R4), augmented fourth/diminished fifth (tritone), perfect fifth (R5), minor seventh (L7), and major seventh (S7).

10. A method as claimed in claim 1, wherein the identified frequency intervals are divided into at least the following sub-groups: unison (R1), minor second (L2), major second (S2), minor third (L3), major third (S3), minor sixth (L6), and major sixth (S6); respectively: perfect fourth (R4), augmented fourth/diminished fifth (tritone), perfect fifth (R5), minor seventh (L7), major seventh (S7), and perfect octave (R8).

11. A method as claimed in claim 1, comprising identifying frequency interval sequences between notes of at least one group comprising at least three of the fundamental notes in succession.

12. A method as claimed in claim 11, wherein the identified frequency interval sequences comprise notes of a major or minor chord.

13. A method as claimed in claim 11, wherein the identified frequency interval sequences comprise ascending or descending arpeggios of major or minor chords.

14. A device for analysing human speech, comprising
(A) measurement means for measuring sounding fundamental notes in a speech sequence to be analysed comprising a filtering unit for separation of fundamental notes having a duration above a predetermined time threshold value and for separating fundamental notes of a loudness above a predetermined amplitude threshold value;
(B) means for identifying frequency intervals between at least two of these fundamental notes in succession; and
(C) means for estimating the frequency at which at least one of the frequency intervals thus identified occurs in the speech sequence to the analysed.

15. A device as claimed in claim 14, wherein the measurement means for measuring fundamental notes further comprises means for establishing the pitch mean value during a predetermined time interval.

16. A device as claimed in claim 14, wherein the means for identification of frequency intervals is designed to at least identify minor thirds (L3) and major thirds (S3).

17. A device as claimed in claim 14, wherein the means for identification of frequency intervals further is designed to identify the frequency interval sequences between notes of at least one group comprising at least three of the fundamental notes in succession.

18. A device for synthetic speech, comprising a device for analysing at least one speech sequence from at least one individual in accordance with claim 14, and means for producing synthetic speech, said means for producing synthetic speech being controlled on the basis of at least some aspect of the analysis produced by said analysing device.

19. A method for automated speech training, comprising
(A) providing an uttered speech sequence by a user;
(B) measuring sounding fundamental notes of the speech sequence to be analysed;
(C) identifying frequency intervals between at least two of these fundamental notes in succession;
(D) assessing the frequency at which at least one of the frequency intervals thus identified occurs in the speech sequence to be analysed; and
(E) comparing the estimated frequency interval frequency with a preferred frequency determined in advance for the user concerned.

20. A method as claimed in claim 19, said method further comprising presenting the results of the comparison between the assessed frequency interval frequency and the preferred frequency determined in advance for the user concerned.

21. A method as claimed in claim 19, said method further comprising identifying suitable measures for reduction of the difference between the assessed frequency interval frequency and the preferred frequency determined in advance.

22. A method as claimed in claim 19, wherein the method is carried out in real time.

23. A method as claimed in claim 19, wherein the preferred frequency determined in advance for the user concerned comprises standard values.

24. A method as claimed in claim 23, wherein said standard values are grouped into at least one of the categories user types and speech training purpose.

25. A device for speech training, comprising:
(A) means for registering a spoken speech sequence;
(B) means for measuring sounding fundamental notes of the speech sequence to be analysed;
(C) means for identifying frequency intervals between at least two of these fundamental notes in succession;
(D) means for assessing the frequency at which at least one of the frequency intervals thus identified occurs in the speech sequence to be analysed; and
(E) means for comparing the assessed frequency interval frequency with a preferred frequency determined in advance for the user concerned.

26. A device as claimed in claim 25, said device further comprising means for presenting the results of the comparison between the assessed frequency interval frequency and the preferred frequency determined in advance for the user concerned.

27. A device as claimed in claim 25 or 26, said device further comprising means for identifying suitable measures for reduction of the difference between the assessed frequency interval frequency and the preferred frequency determined in advance.

28. A device as claimed in claim 25, said device further comprising a database having at least one set of standard values to be used as the preferred frequency determined in advance for the user concerned.

29. A device as claimed in claim 28, said device further comprising a plurality of sets of standard values grouped with regard to at least one of the categories user types and speech training purpose.

30. A method for diagnosing pathological conditions on the basis of a speech analysis, comprising:
(A) uttering a speech sequence by a patient;
(B) measuring sounding fundamental notes of the speech sequence to be analysed;
(C) identifying frequency intervals between at least two of these fundamental notes in succession;

(D) assessing the frequency at which at least one of the frequency intervals thus identified appears in the speech sequence to the analysed; and (E) evaluating at least one such assessed frequency interval frequency by comparing it with a frequency determined in advance for diagnostic purposes.

31. A method as claimed in claim 30, wherein the frequency determined in advance is based on at least one corresponding previous analysis of a speech sequence from the same patient.

32. A method as claimed in claim 31, wherein the frequency determined in advance is based on appraisal of corresponding analyses of at least two speech sequences from the same patient.

33. A method as claimed in claim 31, wherein the frequency determined in advance is based on appraisal of corresponding analyses of more than two speech sequences from the same patient.

34. A method as claimed in claim 30, wherein the frequency determined in advance is based on normal values.

35. A method as claimed in claim 34, wherein patients are further grouped in categories, the frequency determined in advance being based on the normal values applying to the category of users concerned.

36. A method as claimed in claim 34, said method further comprising presenting the results of the evaluation of the comparison between the frequency interval frequency and the frequency determined in advance.

37. A device for diagnosing pathological conditions on the basis of a speech analysis, comprising:

(A) means for registration of an uttered speech sequence;
(B) measurement means for measuring sounding fundamental notes of the speech sequence to be analysed;
(C) identification means for identifying frequency intervals between at least two of these fundamental notes in succession;
(D) assessment means for assessing the frequency at which at least one of the frequency intervals thus identified appears in the speech sequence to be analysed; and
(E) means for evaluating at least one such assessed frequency interval frequency by comparing it with a frequency determined in advance for diagnostic purposes.

38. A device as claimed in claim 37, said device further comprising presentation means for presenting the assessed frequency interval frequency.

39. A device as claimed in claim 37 or 38, said device further comprising a database having at least one set of standard values to be used as the preferred frequency determined in advance for the user concerned, and preferably a plurality of sets of standard values grouped with regard to at least one of the categories user types and diagnosing purpose.

40. A device as claimed in claim 37 or 38, said device further comprising a plurality of sets of standard values grouped with regard to at least one of the categories user types and diagnosing purpose.

* * * * *

UNITED STATES PATENT AND TRADEMARK OFFICE
CERTIFICATE OF CORRECTION

PATENT NO. : 7,092,874 B2 Page 1 of 1
APPLICATION NO. : 10/438805
DATED : August 15, 2006
INVENTOR(S) : Borje Clavbo It is certified that error appears in the above-identified patent and that said Letters Patent is hereby corrected as shown below:

Claim 30, col. 9, line 3, "the" should read --be--.

Signed and Sealed this

Twenty-first Day of November, 2006

JON W. DUDAS
*Director of the United States Patent and Trademark Office*